Feb. 6, 1968     F. W. LEONARD     3,367,614
MOBILE HOME SUPPORT
Filed June 30, 1965     4 Sheets—Sheet 1

INVENTOR
FRANK W. LEONARD

BY *Robert B Coleman*

ATTORNEY

Feb. 6, 1968        F. W. LEONARD        3,367,614
MOBILE HOME SUPPORT

Filed June 30, 1965                            4 Sheets-Sheet 2

INVENTOR
FRANK W. LEONARD
BY *Robert B Coleman*
ATTORNEY

Feb. 6, 1968  F. W. LEONARD  3,367,614
MOBILE HOME SUPPORT
Filed June 30, 1965  4 Sheets-Sheet 3

INVENTOR
FRANK W. LEONARD

BY *Robert B. Coleman*

ATTORNEY

Feb. 6, 1968     F. W. LEONARD     3,367,614
MOBILE HOME SUPPORT

Filed June 30, 1965                                          4 Sheets-Sheet 4

INVENTOR.
FRANK W. LEONARD
BY *Robert B. Coleman*
ATTORNEY

United States Patent Office 3,367,614
Patented Feb. 6, 1968

3,367,614
MOBILE HOME SUPPORT
Frank W. Leonard, Boise, Idaho, assignor to
William A. Teel, Ada, Okla.
Filed June 30, 1965, Ser. No. 468,215
11 Claims. (Cl. 248—354)

This invention relates to a support for mobile homes or trailers or the like, and has as its primary object the provision of a support which may be readily and expeditiously installed beneath a trailer, mobile home or similar structure for semi-permanent location and support thereof which is so designed as to eliminate effectively the consideration of ground contour as a stabilizing value of the device.

A further object of the invention is to provide a braced, point suspension support for such structures.

A further object of the invention is the provision of a support which achieves the above object by transmission of the trailer weight to the ground via a single rod provided with a self-leveling base, means being provided for the adjustment of the effective length of each supporting leg, so that the angle or inclination of the supporting surface has minimum effect on the stability of the mobile home mounted thereon.

A further object of the invention is the provision of such a device which will preclude longitudinal tilting of the trailer body since any leaning of the support leg is effectively precluded by the weight of the trailer on a head plate operatively connected thereto.

A further object of the invention is the provision of a device of this character which may be quickly and expeditiously installed with substantially any size or weight of mobile home, on ground of irregular contour, and which will effectively support and sustain the trailer in level position, regardless of uneven distribution of the weight thereof.

A further object of the invention is the provision of a support of this nature which is sturdy and durable in construction, reliable and efficient in operation, and relatively simple and inexpensive to manufacture and utilize.

Other objects reside in the combination of elements, arrangements of parts, and features of construction, all as will be more fully pointed out hereinafter and disclosed in the accompanying drawings wherein there are shown preferred embodiments of this inventive concept.

In the drawings.

Similar reference characters refer to similar parts throughout the several views of the drawings.

Figure 1:
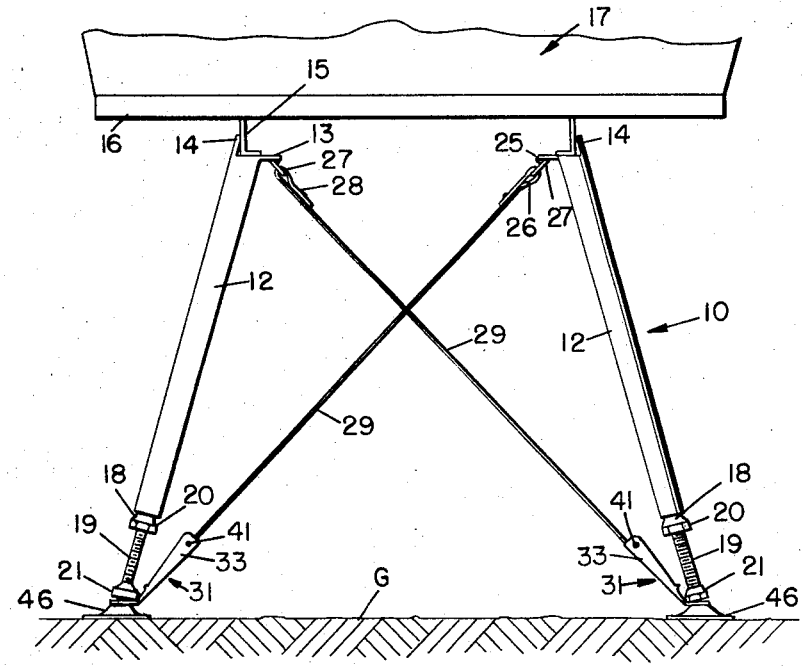
FIGURE 1 is an end elevational view of one form of support embodying the instant inventive concept shown in association with the base of a mobile home.
Figure 2:
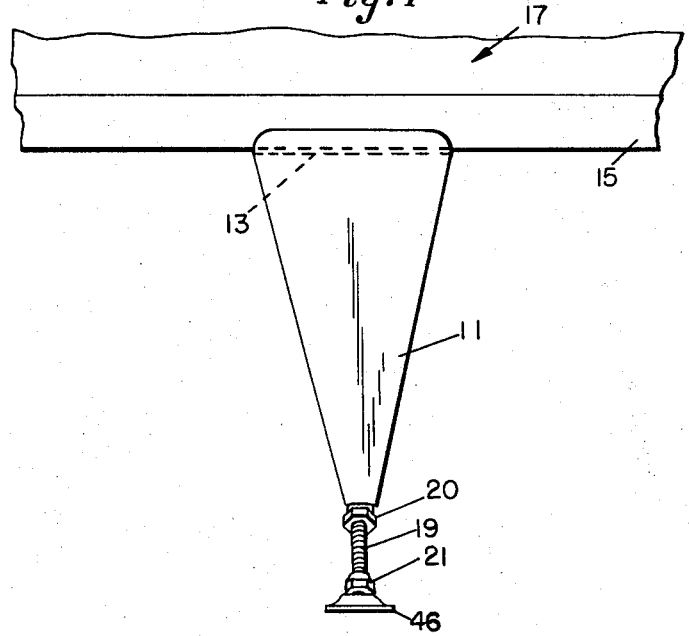
FIGURE 2 is a side elevational view of the construction of FIGURE 1.
Figure 3:
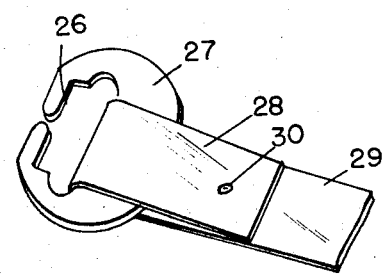
FIGURE 3 is a detail perspective view showing a strap and connection.
Figure 4:
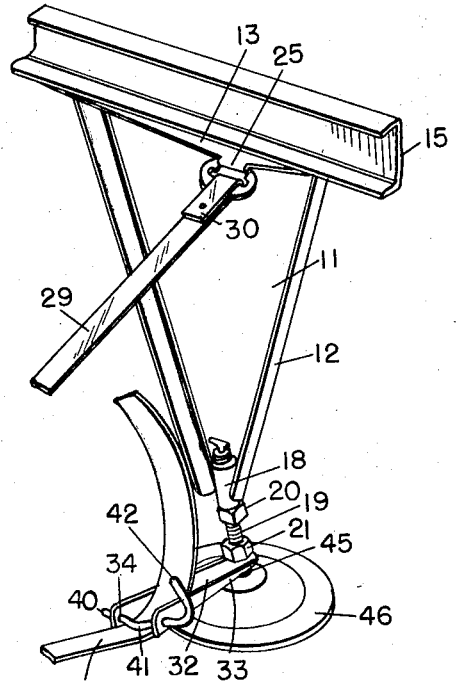
FIGURE 4 is a perspective view showing constructional details, taken from the interior of the device.

Having reference now to the drawings in detail, the device of the instant invention is generally indicated at 10 and comprises a pair of substantially identical complementary opposed triangular supporting plates 11. Each plate includes a pair of side flanges 12, and a base flange 13, the latter being positioned below the upstanding base 14 of the triangular plate to form a seat for one of the longitudinally extending main frame girders 15 supporting the floor 16 of a mobile home, a fragment of which is generally indicated at 17. The apex at the lower end of each supporting plate has rigidly affixed thereto a tubular sleeve 18 having an internal bore in which is mounted an adjusting bolt or stem 19. The stem 19 has an adjusting nut 20 adapted to be positioned adjacent the lower end of the sleeve for holding the stem or bolt in adjusted position, and is also provided with a second nut 21, the purpose of which will be more fully described hereinafter.

Figure 5:
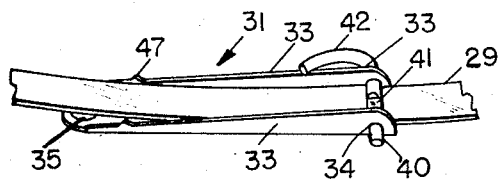
FIGURE 5 is a fragmentary perspective view showing a detail of the connecting brace.
Figure 6:
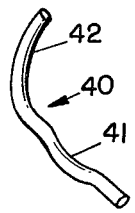
FIGURE 6 is a perspective view showing the locking pin associated with the brace.

Each flange 13 has a downwardly extending reverted tongue 25 which engages a slot 26 in a buckle 27 to which is secured the reverted end 28 of a reinforcing member 29, preferably a flexible strap, the end being secured to the member as by means of bolts or rivets 30. The other end of the member 29 extends longitudinally over a foot clamp 31 which includes a base 32 and a pair of upstanding side flanges 33 having aligned openings 34 therein. The other end of the base has an opening 35 therein through which is adapted to extend the adjusting bolt or stem 19. The aligned openings 34 have a locking pin 40 extended therethrough which includes an offset clamping portion 41 and a laterally extending operating handle 42. Obviously, when the pin is turned to the position of FIGURE 5, with the offset portion 41 clampingly engaging the strap, the same is locked against linear movement. Similarly lifting the handle 42 to release the offset portion will permit linear adjustment of the effective length of each strap.

At the lower end of each adjusting bolt 19 is a ball or head which engages in a suitable socket 45 in a universally mounted circular foot plate 46 which, when the device is in operative position, engages the ground G regardless of the angle of inclination or contour thereof.

In the use and operation of the device, the distance between the main floor girders 15 of the trailer or mobile home to be supported is measured off on the member, preferably a strap, 29, and marked. The strap is then inserted in the foot clamp with the mark adjacent measuring nodes 47 on flanges 33 and the pin 40 rotated by handle 42 in a direction towards the measuring nodes to lock the strap. A jack is employed to raise the front of the mobile home, or the rear as desired, until the opposite end is lowered to the desired level. The assembly is then positioned beneath the main floor girders, with the supports angled slightly outwardly as indicated in FIGURE 1, the adjusting stems being inserted through the openings 35 in the foot clamp. Adjusting nuts 20 and 21 are then rotated until the assembly is balanced and the trailer is level. An additional set of similar plates is mounted in a similar manner at the opposite end of the trailer and leveled in a similar manner, and the supporting jack removed. At this time the trailer is supported in a completely level position to support the trailer in a manner so that the effective suspension is through the threaded bolts in true point suspension eliminating ground contour as a factor in the stabilizing value of the device. Due to the universal mounting of the base plate, the latter can adapt itself to any ground contour independent of the angle of the support leg. Because the earth contacting area is not a function of the rigidity of the device, it cannot twist in the direction of the trailer length as a result of stresses that would normally be encountered, since any longitudinal leaning of the support legs is effectively prevented by the weight of the mobile home.

Figure 7:
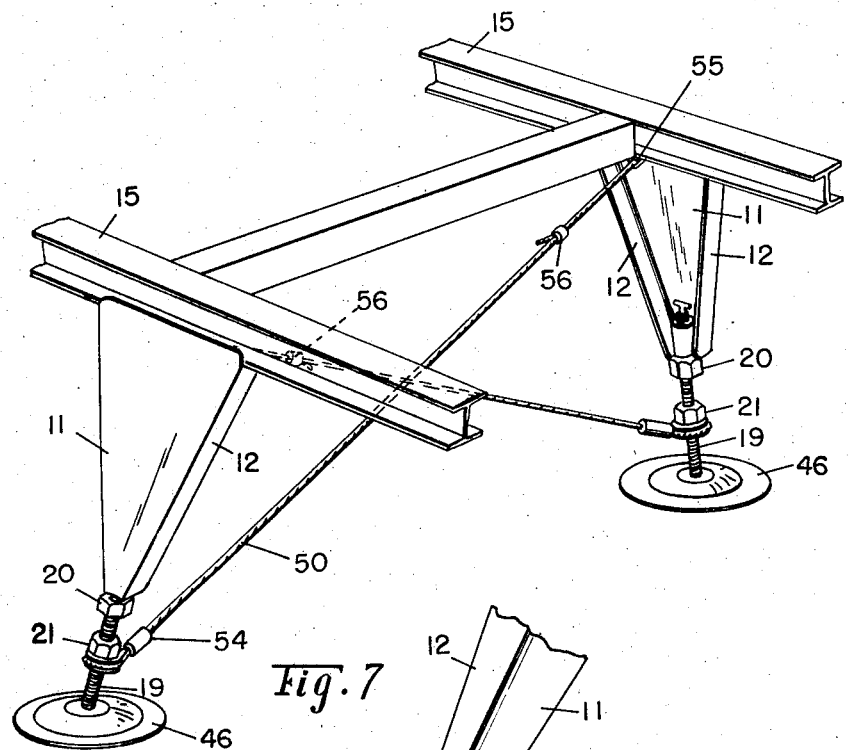
FIGURE 7 is a perspective view of a modified form of construction shown in association with a portion of the trailer frame.
Figure 8:
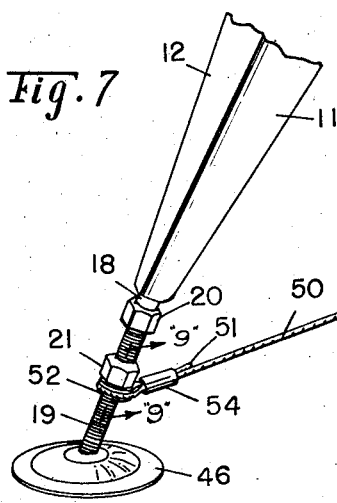
FIGURE 8 is a detail perspective view of the lower end of one of the legs of the structure of FIGURE 7, and, FIGURE 9 is a sectional view taken substantially along the line 9—9 of FIGURE 8 as viewed in the direction indicated by the arrows.
Figure 9:
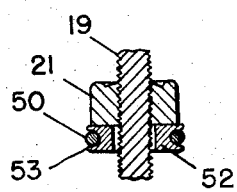

A modified form of the invention is disclosed in FIGURES 7, 8 and 9, wherein the plates 11 and their associated flanges 12 and 13 are identical with those previously described and include the same adjusting nuts 20 and 21 on identical locking bolts 19, mounted on identical feet 46. However, in this modification, strap 29 is eliminated and replaced by an elongated wire 50, the wire 50 being reverted as at 51 around a spool 52 which is linearly movable on bolt 19, and which has a groove 53 therein for the reception of the wire. The reverted end of the wire is clamped by a clamping sleeve 54.

The opposite end of each wire 50 is similarly reverted and extends through an opening in the tongue 55 located in a position identical with that of the tongue 25, and the length is adjustably governed by means of a second clamping sleeve 56.

In this form of the invention the installation, use and operation are substantially identical with that of the modification previously described.

Figure 10:
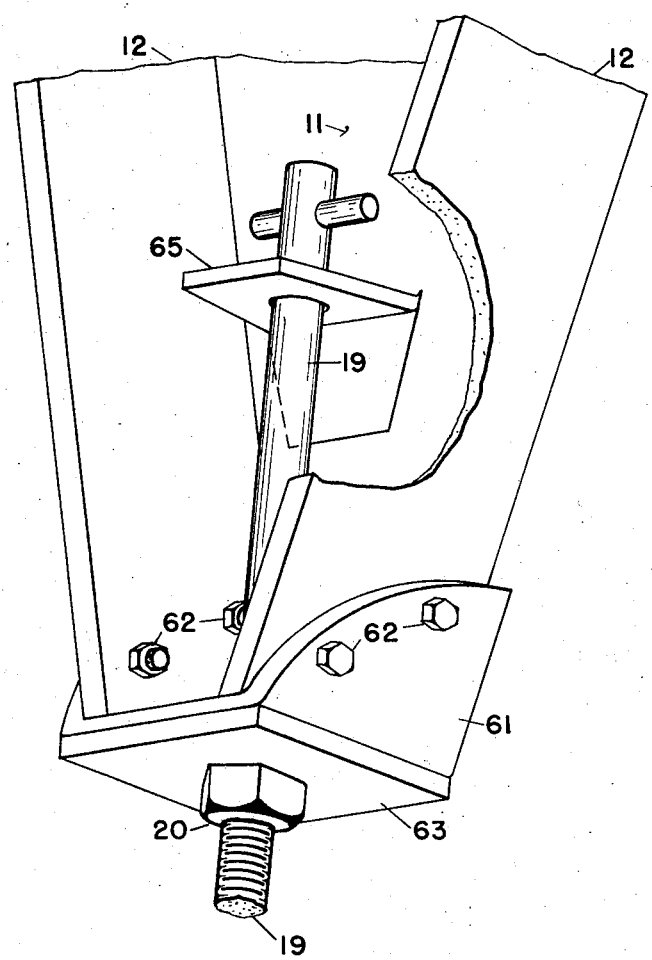
FIGURE 10 is a view, partially cut away, showing a modification of a point suspension support wherein the weight is transmitted via rigid braces.

FIGURE 10 shows still another embodiment of a point suspension support wherein the weight of the trailer or the like is transmitted via rigid support means 12 to plate 61. This plate 61 can be permanently welded to the members 12, but preferably will be attached via bolts 62 and wherein slots, not shown in members 12, are elongated providing for adjusting the angle of the connection. The plate 61 preferably will rest on a second plate or washer 63. The distance then from the ground plate 46 is regulated via nut 20. At the upper end of bolt 19 is a header 65 which prevents the bolt from sliding through plate 61 when no weight is applied. It will be obvious that support members 12 can be of any material or configuration desired, preferably metal angle iron, rods or tubes.

From the foregoing it will now be seen that there is herein provided an improved support for mobile homes or the like which accomplishes all of the objects of this invention, and others, including many embodiments of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

What is claimed is:

1. A support for mobile homes or the like comprising a pair of confronting triangular supporting plates each having a shoulder at its base adapted to seat beneath and engage the opposite main floor girders of a mobile home, a threaded bolt fixed to the lower apex of each triangular supporting plate, reinforcing members extending from the base of each plate to the bolt at the apex of the opposite plate, means adjustably securing the ends of the reinforcing members to said bolt, said means adjustably securing comprising foot plates having openings therein through which said bolts extend and adjusting nuts on said bolts, and means for varying the effective length of the reinforcing members.

2. The structure of claim 1 wherein the reinforcing members are flexible straps.

3. The structure of claim 1 wherein the reinforcing members are angle iron.

4. The structure of claim 1 wherein the reinforcing members are steel rods.

5. The structure of claim 2 wherein means are provided for releasably securing the ends of said straps to the bases of said plates, and comprise reverted tongues extending from each base and a tongue engaging buckle on the adjacent end of each strap.

6. The structure of claim 2 wherein the means for varying the effective length of the straps comprise flanges on the sides of said foot clamps having aligned openings therein, said straps extending between said flanges, and a locking pin having an offset strap clamping portion extending through said openings and rotatable therein.

7. The structure of claim 1 wherein said adjusting bolts are provided with foot plates universally connected thereto.

8. The structure of claim 1 wherein said reinforcing members are wires.

9. The structure of claim 8 wherein the means adjustably connecting said wires to said bolts comprise a spool connected to the end of each wire and a locking nut engaging each spool.

10. The structure of claim 9 wherein the means for varying the effective length of said wires comprise a turnbuckle in each wire.

11. The structure of claim 1 wherein said threaded bolt has a threaded exterior surface and an adjusting nut rotatably mounted on said surface.

References Cited
UNITED STATES PATENTS

| | | | |
|---|---|---|---|
| 420,871 | 2/1890 | Fischer | 24—265 |
| 1,505,046 | 8/1924 | Lush | 40—125 X |
| 1,653,764 | 12/1927 | Goodwin | 248—164 |
| 1,684,727 | 9/1928 | Cerny | 248—188.91 |
| 1,692,568 | 11/1928 | Prettyman | 248—188.91 |
| 2,265,507 | 12/1941 | Anderson et al. | 24—191 X |
| 2,519,364 | 8/1950 | Fredholm | 254—86 |
| 2,578,826 | 12/1951 | Mrofka | 248—188.4 X |
| 2,885,181 | 5/1959 | McCulley et al. | 248—354 X |
| 2,979,304 | 4/1961 | Teel | 248—354 |
| 3,042,986 | 7/1962 | Racette | 24—191 X |
| 3,081,841 | 3/1963 | Maura | 248—188.8 X |
| 3,186,570 | 6/1965 | Bunnell | 248—354 X |

ROY D. FRAZIER, *Primary Examiner.*

CLAUDE A. LE ROY, *Examiner.*

J. F. FOSS, *Assistant Examiner.*